May 17, 1966     H. N. WAGAR     3,252,083
SYSTEM FOR MONITORING CONDITION CHANGES IN A SWITCHING DEVICE
Filed July 22, 1964

INVENTOR
H. N. WAGAR
BY
ATTORNEY

– – –

3,252,083
SYSTEM FOR MONITORING CONDITION
CHANGES IN A SWITCHING DEVICE
Harold N. Wagar, Madison, N.J., assignor to Bell Telephone Laboratories, Incorporated, New York, N.Y., a corporation of New York
Filed July 22, 1964, Ser. No. 384,467
3 Claims. (Cl. 324—28)

This invention pertains generally to electromagnetic switching devices and relates especially to electromagnetic switching devices using so-called sealed contact reed switches.

Sealed contact reed switches of the type referred to herein generally comprise a pair of elongated magnetic contact members or reeds sealed with overlapping tips within a vessel. The overlapping tips of the reeds ordinarily are spaced apart by an air gap so as to be normally open.

In operation, a magnetic flux is established in the vessel in such a manner that it passes serially through the reed members and the air gap therebetween. As the magnetic flux passes from one reed to the other through the air gap, a force of attraction is developed between the reed tips. When the force of attraction becomes sufficiently large, the reed tips are attracted until they touch. Thus, an electrically conducting path is established therebetween.

Because of their small size and low power requirements, reed switches are suitable for many switching applications. They are, moreover, generally reliable in operation.

There are occasions, however, when a reed switch fails to operate. For example, external connections may fail. Moreover, the source of magnetic flux may fail. In either case, the switch is inoperative. It is, therefore, advantageous to be able to check each step in the operation of the switch in order to be certain the switch is actually closed.

Accordingly, one object of this invention is to determine the state or condition of operation of a switch.

Another object of this invention is to determine the condition of operation of a reed switch through the use of a detector coil.

According to this invention, a switch having a magnetic contact is combined with a detector responsive to interactions occurring between flux used to operate the switch and flux developed annularly by current flowing in the magnetic contact. When so combined, the detector identifies various conditions as they occur within the switch.

According to one feature of this invention, a coil is mounted adjacent to a magnetic contact contained in a switch in such a manner that a change of magnetic flux passing longitudinally through the adjacent magnetic contact will induce a voltage in the coil.

Other objects and features of this invention will become apparent from a reading of the specification when taken in conjunction with the drawing in which.

Figure 1:
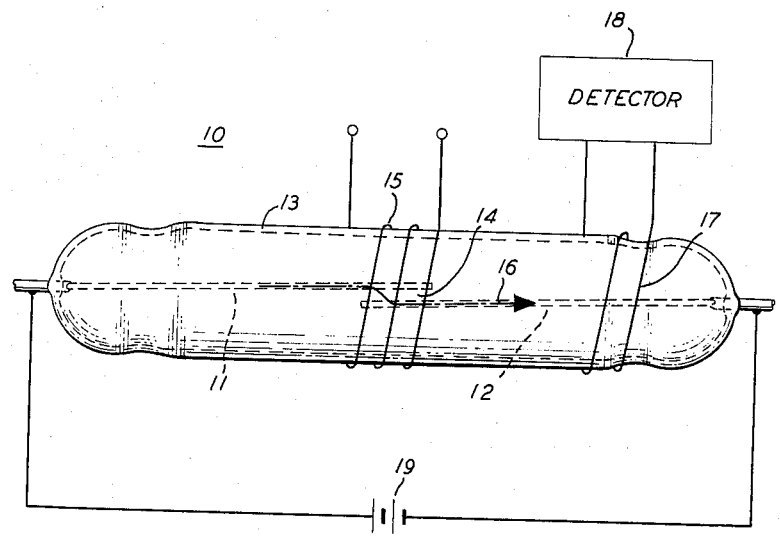
FIG. 1 is an elevation view of one embodiment of this invention.

A switch 10 embodying this invention is illustrated in FIG. 1. The switch 10 comprises a pair of reeds or contacts 11 and 12 sealed within an evacuated vessel 13. The reeds 11 and 12 can advantageously be made of any magnetic material, are electrically conducting, are elongated for convenience, and are sealed within the vessel 13 with their tips overlapped and separated by an air gap 14.

Figure 2:
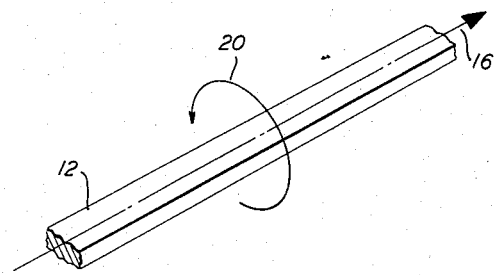
FIG. 2 is an enlarged perspective view of a portion of a contact member illustrating the interaction of magnetic fields therein as employed in this invention.

Associated with the switch 10 is an external source of operative magnetic flux; e.g., the coil 15 shown wrapped around the vessel 13 in FIG. 1. When the coil 15 is energized, an operative or axial flux 16 passes longitudinally through the vessel 13 and serially through the reed 11, the air gap 14, and the reed 12. For the purpose of illustration, the axial flux 16 is shown as an arrow in FIGS. 1 and 2. The direction in which the axial flux 16 traverses the vessel 13 depends on the potential of the coil 15.

A coil 17 is wound around one end of the vessel 13 in proximity to the magnetic contact sealed therein. The coil 17 is arranged to inductively respond to magnitude changes in the axial flux 16 occurring in the proximate magnetic contact. As shown in FIG. 1, the coil 17 is wound on the vessel 13 in proximity to the reed 12.

A detector 18 for identifying various conditions in the switch 10 is connected across the coil 17. The detector 18 may be any voltage or current responsive device such as a gas tube, a transistor, or an oscilloscope.

The ends of the reeds 11 and 12 protrude outside the vessel 13 and leads from an electrical current source 19 are attached thereto. In the arrangement shown in FIG. 1, the reeds 11 and 12 are series elements in an electrical circuit that includes the current source 19.

In operation, the reeds 11 and 12 are closed by the axial flux 16 to allow a current from the source 19 to flow through the switch 10. The switch 10 progresses through various conditions during operation.

A first condition occurs when the axial flux 16 is initially applied to the switch 10. As the coil 15 is energized, the axial flux 16 therefrom passes through the reeds 11 and 12 and the air gap 14. Accordingly, the magnitude of the axial flux 16 in the switch 10 changes from zero to a steady-state value during the first condition. Thus, the occurrence of the first condition indicates that the axial flux 16 is present in the switch 10.

The detector 18 responds to flux changes occurring during the first condition. As the magnitude of the axial flux 16 passing through the reeds 11 and 12 and the air gap 14 changes, an electrical potential is inductively produced in the coil 17. As a result, an output is observed by the detector 18. Thus, the detector 18 responds to the first condition.

A second condition occurs in the switch 10 when the reeds 11 and 12 touch and a current flows. Current flows when sufficient axial flux 16 is applied to the reeds 11 and 12 and they touch. The flowing current develops an annular magnetic flux in each reed. The annular magnetic flux is illustrated by the arrow 20 in FIG. 2.

The annular flux 20 interacts with the axial flux 16. As a result of the interaction, the magnitude of the axial flux 16 is reduced. Since a reduction in magnitude is a change in the axial flux 16, an output is induced in the coil 17 and an output is observed by the detector 18. Thus, the occurrence of the second condition indicates current is flowing through the switch 10.

The output observed by the detector 18 for the second condition will have a lesser magnitude and a different polarity than the output observed by the detector 18 for the first condition. Thus, the detector 18 responds to the second condition and distinguishes it from the first condition.

Third and fourth conditions are also observed by the detector 18. The third condition occurs when the current passing through the reeds 11 and 12 is interrupted. Thus, the occurrence of the third condition indicates current has ceased to flow in the switch 10.

When the current flowing in the switch 10 is interrupted, the annular flux 20 will disappear. When the annular flux 20 disappears, there is nothing left to maintain the reduced magnitude of the axial flux 16. Accordingly, the axial flux 16 will increase in magnitude back to its original steady-state condition.

The change in the axial flux 16 back to the steady-state condition produces an otuput in the coil 17. The output will have a magnitude similar to the output observed for the second condition, but the polarities of the two outputs will be different. Thus, the detector 18 responds to the third condition and distinguishes between the first, second, and third conditions.

Finally, the fourth condition occurs when the axial flux 16 is entirely removed and indicates flux is no longer present in the switch 10. When the axial flux 16 ceases to flow through the switch 10, the detector 18 will observe an output similar to that observed when the axial flux 16 was initially applied; i.e., for the first condition. The polarities, however, of the outputs for the first and fourth conditions will be different. Thus, the detector 18 responds to the fourth condition and distinguishes between all four conditions.

In the foregoing, the output observed by the detector 18 has been induced in the coil 17. A similar output, however, is induced in the coil 15. As a result, the detector 18 may also be connected across the coil 15 with the same results.

The output observed by the detector 18 for the second or third condition is produced when the annular magnetic flux 20 interacts with the axial magnetic flux 16. It is theorized that the interaction of the two fluxes causes the magnetic domains in the reed members to swing to the left or right of the axis along which the axial flux 16 passes. The direction of swing, either left or right, is a function of the direction of the annular flux 20. In either event, the swing away from the main axis is considered to produce the reduction or depression of the axial flux 16.

It is of interest to note that whether the swing is to the right or to the left, the effect is the same; viz., the magnitude of the axial flux 16 is decreased. As a consequence, the polarity of the output observed by the detector 18 for the second or third condition is not affected by the direction in which current flows through the reed switch 10.

From the foregoing, it can be seen that the axial magnetic flux 16 acting alone in the switch 10 produces distinguishable effects. Moreover, the axial flux 16 and the annular flux 20 acting together produce distinguishable combined effects neither alone exhibits. Furthermore, all of the effects are associated with particular switch conditions. Finally, available equipment can be used to detect a particular effect thus indicating the prevailing condition in the switch 10.

Accordingly, there has been disclosed herein a magnetic switching device capable of determining the condition of its operation. It will be noted, however, that the embodiment disclosed herein is illustrative of the principles of the invention only and many other modifications and arrangements within the scope of this invention can readily be achieved by those skilled in the art.

What is claimed is:

1. A magnetic switching device comprising:
   a source of magnetic flux;
   switching means disposed in the path of flux from said source, said switching means comprising a plurality of contacts engageable with each other for establishing an electrically conducting path in response to flux from said source;
   a current source for supplying current to said contacts; and
   means for responding to a first, second, third, and fourth pulse induced by changes in said magnetic flux and indicating the state of operation of the switching device, said first pulse being induced when flux from said source is initially applied to said switching means, said second pulse being induced when current is initially supplied to said contacts, said third pulse being induced when current supplied to said contacts is interrupted, and said fourth pulse being induced when flux from said source is removed from said switching means.

2. In a switching device arranged to monitor its own switching condition, the combination comprising:
   an elongated tube sealed at both ends;
   a first contact member having a fixed end and a free end, said fixed end being sealed in one end of said tube and said free end extending within said tube;
   a second contact member having a fixed end and a free end, said fixed end being sealed in the other end of said tube and said free end extending within said tube, the free ends of said first and second contact members being arranged to overlap each other and being spaced apart by an air gap;
   a magnetic flux source arranged to pass a magnetic flux serially through said first and second contact members and said air gap, the magnitude of said magnetic flux when applied being sufficient to attract the free ends of said first and second contact members together;
   a current source arranged to pass an electrical current through said first and second contact members after the free ends thereof have been attracted together;
   a coil, wound around said tube adjacent to one of said contact members, for generating voltages in response to changes in the magnetic flux passing through said one contact member;
   and means connected across said coil for exhibiting distinctive signals in response to the presence of each of a first, second, third, and fourth voltage generated by said coil whereby changing operating conditions in the switching device are readily determined, said first voltage being generated by said coil in response to the initial application of magnetic flux through said one contact member and having a first polarity and a first magnitude, said second voltage being generated by said coil in response to the initial passage of said electrical current through said one contact member and having a second polarity and a second magnitude, said third voltage being generated by said coil in response to the interruption of said electrical current passing through said one contact member and having said first polarity and said second magnitude, and said fourth voltage being generated by the removal of said magnetic flux from said one contact member and having said second polarity and a third magnitude equal to said first magnitude when said contact member is not conducting an electrical current at the time when said magnetic flux is removed.

3. In a switching device having overlapping contact members arranged to close an electrical circuit in response to the application of an axial magnetic flux through said switch and to conduct an electrical current after said electrical circuit is closed, the method of monitoring the changing conditions in said switching device comprising the steps of:
   measuring the change in direction and magnitude of axial magnetic flux when said axial magnetic flux is initially applied to said switch;
   measuring the change in direction and magnitude of said axial magnetic flux when said electrical current first starts to flow through said electrical circuit;

measuring the change in direction and magnitude of said axial magnetic flux when said electrical current is interrupted;

and measuring the change in direction and magnitude of said axial magnetic flux when said axial magnetic flux is removed from said switch.

References Cited by the Examiner

UNITED STATES PATENTS 2,981,810   4/1961   Nitsch _____ 200—87
3,146,325   8/1964   Gribble _____ 200—102

BERNARD A. GILHEANY, *Primary Examiner.*

B. DOBECK, *Assistant Examiner.*